United States Patent
Brus et al.

(10) Patent No.: US 9,125,223 B2
(45) Date of Patent: Sep. 1, 2015

(54) METHODS PROVIDING BUFFER ESTIMATION AND RELATED NETWORK NODES AND WIRELESS TERMINALS

(75) Inventors: Linda Brus, Vällingby (SE); Graham C Goodwin, Newcastle (AU); Katrina Lau, Newcastle (AU); Mauricio Cea, Newcastle (AU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 188 days.

(21) Appl. No.: 13/703,993

(22) PCT Filed: Jul. 10, 2012

(86) PCT No.: PCT/SE2012/050822
§ 371 (c)(1),
(2), (4) Date: Dec. 13, 2012

(87) PCT Pub. No.: WO2013/187817
PCT Pub. Date: Dec. 19, 2013

(65) Prior Publication Data
US 2013/0336236 A1   Dec. 19, 2013

Related U.S. Application Data

(60) Provisional application No. 61/659,114, filed on Jun. 13, 2012.

(51) Int. Cl.
*H04W 72/12* (2009.01)
*H04L 1/00* (2006.01)
(Continued)

(52) U.S. Cl.
CPC ......... *H04W 72/1278* (2013.01); *H04L 1/0002* (2013.01); *H04L 1/0018* (2013.01); *H04L 1/0035* (2013.01); *H04L 47/30* (2013.01); *H04W 28/02* (2013.01); *H04W 72/12* (2013.01)

(58) Field of Classification Search
None
See application file for complete search history.

(56) References Cited

U.S. PATENT DOCUMENTS

2007/0073895 A1* 3/2007 Sebire et al. ............. 709/230
2009/0092202 A1* 4/2009 Kim et al. ................. 375/295
(Continued)

FOREIGN PATENT DOCUMENTS

EP   1 509 011 A2   2/2005
EP   1 708 524 A1   10/2006
(Continued)

OTHER PUBLICATIONS

International Search Report and Written Opinion Corresponding to International Application No. PCT/SE2012/050822; Date of Mailing: May 24, 2013; 25 Pages.
(Continued)

*Primary Examiner* — Rhonda Murphy
(74) *Attorney, Agent, or Firm* — Myers Bigel Sibley & Sajovec, P.A.

(57) ABSTRACT

A method may be provided to operate a node of a radio access network communicating with a wireless terminal. The wireless terminal may be configured to provide a transmit buffer for data to be transmitted to the node during transmission time intervals, to transmit packets of the data from the transmit buffer to the node during respective transmission time intervals, and to provide buffer indicator bits with respective packets of the data during the respective transmission time intervals. The method may include: receiving a packet including data and a buffer indicator bit from the wireless terminal during a respective transmission time interval; and providing an estimate of a quantity of data in the transmit buffer at the wireless terminal responsive to a status of the buffer indicator bit. Related wireless terminals and network nodes are also discussed.

12 Claims, 12 Drawing Sheets

(51) Int. Cl.
*H04W 28/02* (2009.01)
*H04L 12/835* (2013.01)

(56) References Cited

U.S. PATENT DOCUMENTS

2011/0075742 A1* 3/2011 Zhang et al. .................. 375/259
2011/0218006 A1* 9/2011 Hanaki et al. ................. 455/509

FOREIGN PATENT DOCUMENTS

| EP | 1 833 203 A1 | 9/2007 |
| WO | WO 2009/045074 A2 | 4/2009 |
| WO | WO 2010/051513 A2 | 5/2010 |
| WO | WO 2011/017675 A1 | 2/2011 |
| WO | WO 2011/025427 A1 | 3/2011 |

OTHER PUBLICATIONS

3GPP TS 25.331 V11.1.0 (Mar. 2012) "Technical Specification Group Radio Access Network"; $3^{rd}$ Generation Partnership Project; Radio Resource Control (RRC); Protocol Specification (Release 11); 1,911 pages.

3GPP TS 25,321 V11.0.0 (Dec. 2011) "Technical Specification Group Radio Access Network"; $3^{rd}$ Generation Partnership Project; Medium Access Control (MAC) protocol specification (Release 11); pp. 96, and 154-155, Dec. 2011.

3GPP TS 25.321 V10.2.0 (Mar. 2011) "Technical Specification Group Radio Access Network"; $3^{rd}$ Generation Partnership Project; Medium Access Control (MAC) protocol specification (Release 10); p. 154-155, Mar. 2011.

* cited by examiner

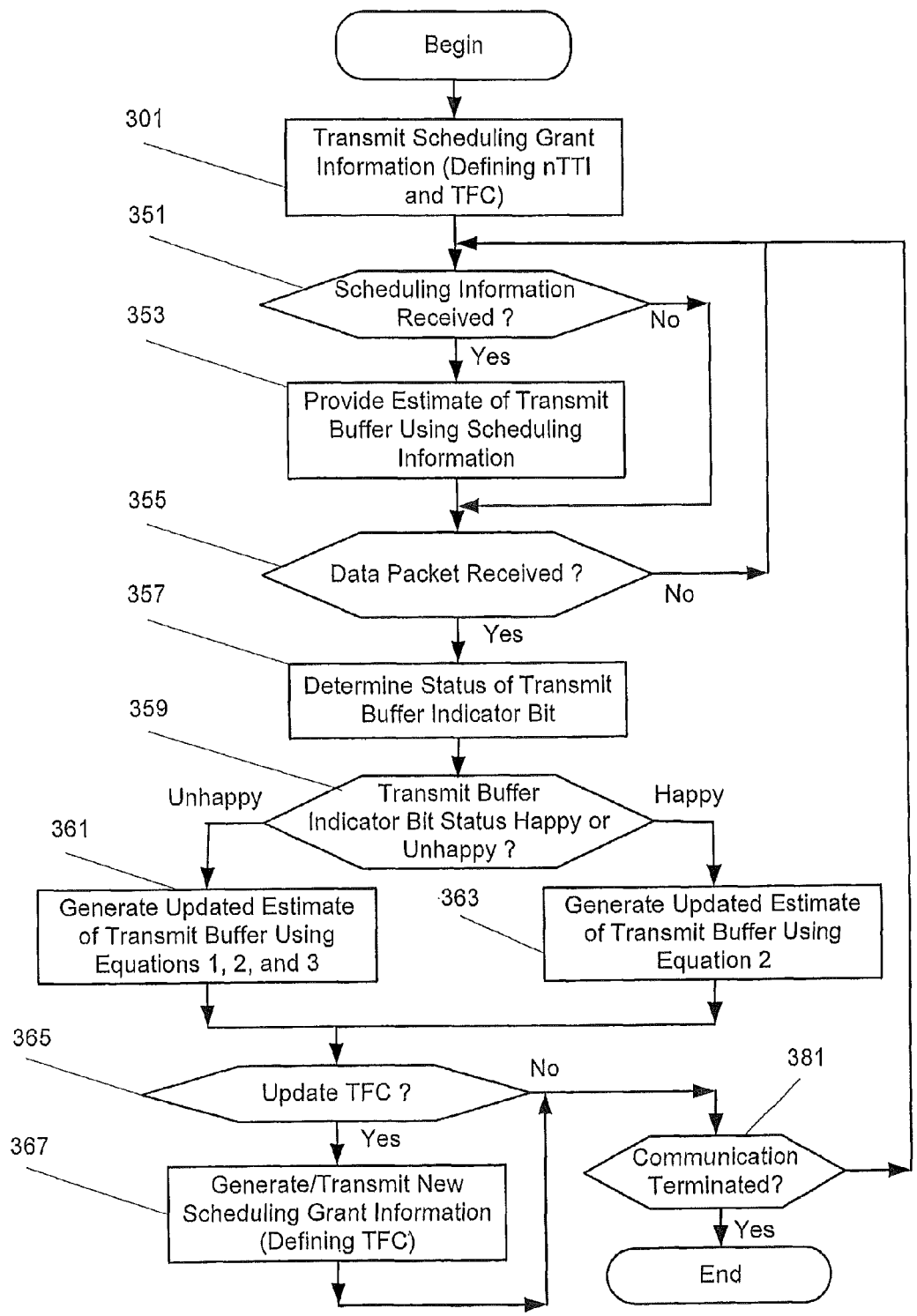

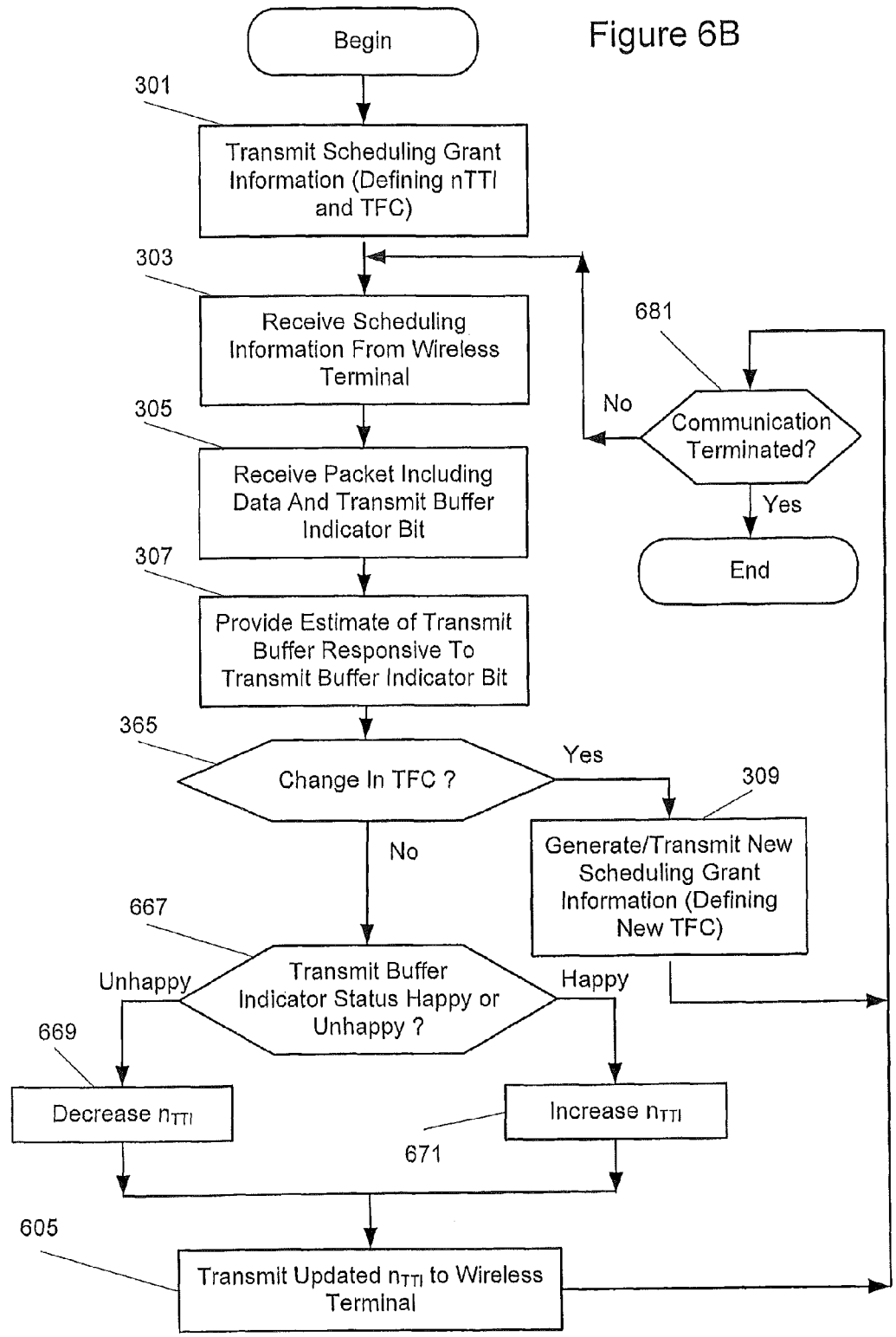

Figure 8

Table 1 – Happy bit delay condition and nTTI granularity levels for simulations

| Level | Value for happy bit delay condition (ms) as defined by [2] | Value for nTTI (# 2 ms TTIs) |
|---|---|---|
| 1 | 2 | 1 |
| 2 | 10 | 5 |
| 3 | 20 | 10 |
| 4 | 50 | 25 |
| 5 | 100 | 50 |
| 6 | 200 | 100 |
| 7 | 500 | 250 |
| 8 | 1000 | 500 |

METHODS PROVIDING BUFFER ESTIMATION AND RELATED NETWORK NODES AND WIRELESS TERMINALS

CROSS-REFERENCE TO RELATED APPLICATION

This application is a 35 U.S.C. §371 national stage application of PCT International Application No. PCT/SE2012/050822, filed on 10 Jul. 2012, which claims priority to U.S. Provisional Application No. 61/659,114, filed on 13 Jun. 2012. The disclosures of the applications are hereby incorporated herein in their entireties by reference.

TECHNICAL FIELD

The present disclosure is directed to communications and, more particularly, to radio communications and related methods, devices, and computer program products.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as an RBS, a base station, a RAN node, a "NodeB", and/or enhanced NodeB "eNodeB"). A cell area is a geographical area where radio coverage is provided by the base station equipment at a base station site. The base stations communicate through radio communication channels with wireless terminals within range of the base stations.

A wireless terminal generates transmission data to be transmitted to a radio base station during one or more transmission time intervals, and when the wireless terminal generates transmission data more quickly than it can be transmitted, the transmission data is queued in a transmit buffer for transmission during a subsequent Transmission Time Interval(s) or TTI(s). The base station, for example, may designate a Transport Format Combination TFC (e.g., an E-DCH transport format combination or E_TFC) that defines a data rate for the wireless terminal, and the designated transport format combination TFC may thus define a number of data bits that may be transmitted by the wireless terminal during a TTI. A higher TFC thus allows the wireless terminal to transmit a greater number of data bits during a TTI, and a lower TFC restricts the wireless terminal to transmitting a lesser number of data bits during a TTI.

In addition to the data bits, the wireless terminal may also transmit a buffer indicator bit, such as a happy bit, each TTI. A happy bit is defined, for example, by the 3GPP ($3^{rd}$ Generation Partnership Group) standard, 3GPP TS 25.321, V11.0.0, MAC protocol specification, version, Release 11, sections 9.2.5.3.1 and 11.8.1.5, December 2012. The happy bit is included on the E-DPCCH (E-DCH Dedicated Physical Control Channel) for every E-DCH (Enhanced Dedicated Channel) transmission on each Activated Uplink Frequency, RRC (Radio Resource Control) configures MAC (Medium Access Control) with a Happy_Bit_Delay_Condition over which to evaluate a current grant relative to the TEBS (Total E-DCH Buffer Status) after application of an E_TFC (E-DCH Transport Format Combination) selection procedure. More particularly, the Happy_Bit_Delay_Condition (HBDC) may be defined as the product of a happy bit delay, in seconds or milliseconds, and the bit-rate according to a current E_TFC in bits/second, or equivalently as the product of a number of transmission time intervals ($n_{TTI}$) and a number of bits transmitted during one TTI according to a current E_TFC, such that the Happy_Bit_Delay_Condition (HBDC) is equal to $n_{TTI}*ETFC$.

For every E-DCH transmission and for each Activated Uplink Frequency, the Happy Bit on a frequency is set to "unhappy" if all of the three following criteria are met on that frequency:
(1) The wireless terminal (UE) is transmitting as much scheduled data (defined by E_TFC) as allowed by the current Serving_Grant on that frequency; and
(2) The wireless terminal (UE) has enough power available to transmit at a higher data rate on that frequency; and
(3) The amount of data in the wireless terminal transmit buffer exceeds the Happy_Bit_Delay_Condition (HBDC) defined as HBDC=$n_{TTI}*E\_TFC$ so that the wireless terminal transmit buffer cannot be emptied in a time (e.g., a number of TTIs) specified by $n_{TTI}$ at a current data rate (e.g., a number of bits per TTI specified by the current Transport Format Combination or E_TFC).

For example, a value of the HBDC may take one of 8 values between (and including) 2 milliseconds (ms) and 1000 milliseconds (ms), and these HBDCs may be mapped to values of $n_{TTI}$. For example, values of $n_{TTI}$ (a number of TTIs) may take one of eight values including: 1 corresponding to a 2 millisecond delay condition; 5 corresponding to a 10 millisecond delay condition; 10 corresponding to a 20 millisecond delay condition; 25 corresponding to a 50 millisecond delay condition; 50 corresponding to a 100 millisecond delay condition; 100 corresponding to a 200 millisecond delay condition; 250 corresponding to a 500 millisecond delay condition; and 500 corresponding a 1000 millisecond delay condition. The HBDC, $n_{TTI}$, and/or an indicator thereof may be transmitted from the radio base station to the wireless terminal as the communication/call/session/link is set up (e.g., as the wireless terminal enters a CELL DCH state or CELL dedicated channel state) in accordance with the RRC (Radio Resource Control) specification.

The wireless terminal can thus calculate the Happy_Bit_Delay_Condition (HBDC) as HBDC=$n_{TTI}*E\_TFC$ (using $n_{TTI}$ and E_TFC values provided by the base station), and the wireless terminal may determine the happy bit value for each TTI based on whether a current amount of data in the transmit buffer exceeds HBDC or not. Stated in other words, the wireless terminal can calculate a number of bits that may be transmitted over a period of time specified by the current HBDC calculated as $n_{TTI}*E\_TFC$ (effectively, a product of a time period and a bit-rate).

The buffer indicator bit (e.g., the happy bit) may be used by the base station to make scheduling decisions for the wireless terminal as follows: increase or maintain E_TFC (the number of bits transmitted by the wireless terminal during a TTI) if the wireless terminal transmits an unhappy bit; or decrease E_TFC (the number of bits transmitted by the wireless terminal during a TTI) if the wireless terminal transmits a happy bit or a series of consecutive happy bits.

Additionally, scheduling information may be transmitted from the wireless terminal to the radio base station over an E-DCH in accordance with 3GPP TS 25.321, V11.0.0, MAC protocol specification, Release 11, sections 9.2.5.3.2 and 11.8.1.6, December 2012, along with a regular data transmission(s). The scheduling information may be transmitted periodically (as configured by the RRC specification when the connection is set up) and/or opportunistically in bits that would otherwise by unused or spare. The scheduling information may include 18 bits as follows:

(1) Highest priority logical channel ID (HLID)=4 bits;
(2) Total E-DCH Buffer Status (TEBS)=5 bits;
(3) Highest priority Logical channel Buffer Status (HLBS)=4 bits; and
(4) UE Power Headroom (UPH)=5 bits.

The scheduling information thus includes more detailed information defining the status of the transmit buffer (the Total E-DCH Buffer Status or TEBS) and the power available to the wireless terminal (UE Power Headroom or UPH) than may be available from a happy bit. The scheduling information, however, may be transmitted less frequently than the happy bit because the scheduling information consumes greater bandwidth that could otherwise be used for data transmission. Stated in other words, each transmission of the scheduling information may consume 18 bits of an uplink transmission that could otherwise be used to transmit data thereby reducing an effective bit rate for uplink transmissions from the wireless terminal to the base station.

Accordingly, there continues to exist a need to provide improved scheduling of transmissions in a wireless network.

SUMMARY

It is therefore an object to address at least some of the above mentioned disadvantages.

According to some embodiments of the present invention, a method may be provided to operate a node of a radio access network communicating with a wireless terminal. The method may include receiving a packet including data and a buffer indicator bit from the wireless terminal during a transmission time interval, and providing an estimate of a quantity of data in a transmit buffer at the wireless terminal responsive to a status of the buffer indicator bit. Buffer indicator bits may thus be used at a radio base station to provide improved and/or more reliable estimates of wireless terminal transmit buffers, to provide improved scheduling decisions, and/or to provide reduced underutilization of scheduled resources.

Responsive to a first status of the buffer indicator bit, providing the estimate may include generating a second estimate of the quantity of data in the transmit buffer as a first estimate of the quantity of data in the transmit buffer less a quantity of data allowed in a packet of a transmission time interval. Responsive to a second status of the buffer indicator bit, providing the estimate may include generating a second estimate of the quantity of data in the transmit buffer as the greater of a quantity of data defining a transmit buffer delay condition and a first estimate of the quantity of data in the transmit buffer less a quantity of data allowed in a packet of a transmission time interval.

The quantity of data allowed in a packet may be a first quantity of data allowed in a packet. Before providing the estimate, information may be transmitted to the wireless terminal defining the first quantity of data allowed in a packet and defining a number of transmission time intervals for the transmit buffer delay condition. Responsive to providing the estimate, information may be transmitted to the wireless terminal defining a second quantity of data allowed in a packet wherein the first and second quantities of data are different. The quantity of data defining the transmit buffer delay condition may be calculated as a product of the first quantity of data allowed in a packet and the number of transmission time intervals for the transmit buffer delay condition.

Before providing the estimate, scheduling information may be received from the wireless terminal with the scheduling information including buffer status and power headroom information for the wireless terminal. The first estimate of the quantity of data in the transmit buffer may be generated responsive to the scheduling information including the buffer status.

The buffer indicator bit may include a happy bit as defined according to 3GPP standards, and the transmit buffer delay condition may include a Happy_Bit_Delay_Condition defined according to 3GPP standards.

Before receiving the packet, information may be transmitted to the wireless terminal defining a first quantity of data allowed in a packet, and a second quantity of data allowed in a packet may be determined responsive to the estimate of the quantity of data in the transmit buffer. When the first and second quantities of data are different, information may be transmitted to the wireless terminal defining the second quantity of data allowed in a packet, and when the first and second quantities of data are the same, a number of transmission time intervals defining the delay condition for the transmit buffer may be updated responsive to a status of the buffer indicator bit.

A number of transmission time intervals defining the delay condition for the transmit buffer may be updated responsive to a status of the buffer indicator bit, and the updated number of transmission time intervals defining the delay condition may be transmitted to the wireless terminal. Before receiving the packet including the data and the buffer indicator bit, information may be transmitted to the wireless terminal defining a first number of transmission time intervals for a first delay condition and defining a first quantity of data allowed in a packet. Updating the number of transmission time intervals may include generating a second number of transmission time intervals for a second delay condition for the transmit buffer responsive to the status of the buffer indicator bit, and transmitting the updated number of transmission time intervals may include transmitting the second number of transmission time intervals defining the second delay condition for the transmit buffer.

Updating the number of transmission time intervals may include increasing the first number of transmission time intervals to generate the second number of transmission time intervals for the second delay condition for the transmit buffer responsive to a first status of the buffer indicator bit. Updating the number of transmission time intervals may include decreasing the first number of transmission time intervals to generate the second number of transmission time intervals for the second delay condition for the transmit buffer responsive to a second status of the buffer indicator bit.

Moreover, the packet may be received from the wireless terminal including data from the transmit buffer of the wireless terminal. The wireless terminal, for example, may provide the transmit buffer for data to be transmitted to the node during transmission time intervals, and the wireless terminal may transmit packets of the data from the transmit buffer with buffer indicator bits during respective transmission time intervals.

According to some other embodiments of the present invention, a method of operating a wireless terminal communicating with a node of a radio access network may include providing a transmit buffer for data to be transmitted during transmission time intervals. A first buffer indicator bit for a first transmission time interval may be determined responsive to a first number of transmission time intervals for a first delay condition, a first quantity of data allowed in a packet, and a first quantity of data in a transmit buffer of the wireless terminal, and a first packet may be transmitted including the first buffer indicator bit and a first plurality of data bits from the transmit data buffer. A second buffer indicator bit for a second transmission time interval may be determined responsive to a second number of transmission time intervals for a second delay condition, the first quantity of data allowed in a packet, and a second quantity of data in the transmit buffer, and a second packet may be transmitted including the second buffer indicator bit and a second plurality of data bits from the transmit data buffer. By supporting adaptive delay conditions during a same radio link communication/session/call, the wireless terminal may allow a base station node to more accurately estimate a quantity of data in a transmit buffer of the wireless terminal.

Before determining the first buffer indicator bit, information from the node may be received defining the first number of transmission time intervals for the first delay condition and defining the first quantity of data allowed in a packet, and before determining the second buffer indicator bit, information may be received defining the second number of transmission time intervals for the second delay condition. Information may be received defining a second quantity of data allowed in a packet. A third buffer indicator bit for a third transmission time interval may be determined responsive to the second number of transmission time intervals for the second delay condition, the second quantity of data allowed in a packet, and a third status of the transmit buffer. A third packet may be transmitted including the third buffer indicator bit and a third plurality of data bits from the transmit data buffer.

The first and second buffer indicator bits may include respective first and second happy bits as defined according to 3GPP standards.

Determining the first buffer indicator bit may include comparing the first quantity of data in the transmit buffer with a product of the first number of transmission time intervals for the first delay condition and the first quantity of data allowed in a packet, and determining the second buffer indicator bit may include comparing the second quantity of data in the transmit buffer with a product of the second number of transmission time intervals for the second delay condition and the first quantity of data allowed in a packet.

According to still other embodiments of the present invention, a node of a radio access network may include a transmitter and a processor coupled to the transceiver. The transceiver may be configured to transmit radio communications to a wireless terminal and to receive radio communications from a wireless terminal during transmission time intervals. The processor may be configured to receive a packet including data and a buffer indicator bit from the wireless terminal during a transmission time interval, and to provide an estimate of a quantity of data in a transmit buffer at the wireless terminal responsive to a status of the buffer indicator bit.

According to yet other embodiments of the present invention, a wireless terminal may include a transceiver and a processor coupled to the transceiver. The transceiver may be configured to transmit radio communications to a node of a radio access network and to receive radio communications from the node of the radio access network. The processor may be configured to: provide a transmit buffer for data to be transmitted during transmission time intervals; determine a first buffer indicator bit for a first transmission time interval responsive to a first number of transmission time intervals for a first delay condition, a first quantity of data allowed in a packet, and a first quantity of data in the transmit buffer; transmit a first packet including the first buffer indicator bit and a first plurality of data bits from the transmit data buffer through the transceiver to the node; determine a second buffer indicator bit for a second transmission time interval responsive to a second number of transmission time intervals for a second delay condition, the first quantity of data allowed in a packet, and a second quantity of data in the transmit buffer; and transmit a second packet including the second buffer indicator bit and a second plurality of data bits from the transmit data buffer through the transceiver to the node.

According to yet other embodiments of the present invention, methods may be provided to operate a node of a radio access network communicating with a wireless terminal. The method of operating the node may include receiving a packet including data and a buffer indicator bit from the wireless terminal during a respective transmission time interval, and updating a number of transmission time intervals defining the delay condition for a transmit buffer of the wireless terminal responsive to a status of the buffer indicator bit. The updated number of transmission time intervals defining the delay condition may be transmitted to the wireless terminal.

The method may further include transmitting information to the wireless terminal defining a first number of transmission time intervals for a first delay condition and defining a first quantity of data allowed in a packet before receiving the packet including the data and the buffer indicator bit. Moreover, updating the number of transmission time intervals may include generating a second number of transmission time intervals for a second delay condition for the transmit buffer responsive to the status of the buffer indicator bit, and transmitting the updated number of transmission time intervals may include transmitting the second number of transmission time intervals defining the second delay condition for the transmit buffer.

Updating the number of transmission time intervals may include: responsive to a first status of the buffer indicator bit, increasing the first number of transmission time intervals to generate the second number of transmission time intervals for the second delay condition for the transmit buffer; and responsive to a second status of the buffer indicator bit, decreasing the first number of transmission time intervals to generate the second number of transmission time intervals for the second delay condition for the transmit buffer.

The buffer indicator bit may be a happy bit as defined according to 3GPP standards, and the transmit buffer delay condition may be a Happy_Bit_Delay_Condition defined according to 3GPP standards.

The method may further include providing an estimate of a quantity of data in the transmit buffer at the wireless terminal responsive to a status of the buffer indicator bit.

Responsive to a first status of the buffer indicator bit, providing the estimate may include generating a second estimate of the quantity of data in the transmit buffer as a first estimate of the quantity of data in the transmit buffer less a quantity of data allowed in a packet of a transmission time interval. Responsive to a second status of the buffer indicator bit, providing the estimate may include generating a second estimate of the quantity of data in the transmit buffer as the greater of a quantity of data defining a transmit buffer delay condition and a first estimate of the quantity of data in the transmit buffer less a quantity of data allowed in a packet of a transmission time interval.

According to yet other embodiments of the present invention, a node of a radio access network may include a transceiver configured to transmit radio communications to a wireless terminal and to receive radio communications from a wireless terminal during transmission time intervals and a processor coupled to the transceiver. The processor may be configured to: receive a packet including data and a buffer indicator bit from the wireless terminal through the transceiver during a respective transmission time interval; update a number of transmission time intervals defining the delay condition for the transmit buffer responsive to a status of the buffer indicator bit; and transmit the updated number of transmission time intervals defining the delay condition through the transceiver to the wireless terminal.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIGS. 3A and 3B are a flow chart illustrating transmit buffer estimator operations according to some embodiments;

FIGS. 6A and 6B are a flow chart illustrating base station processor operations according to some embodiments;

FIG. 8 is a table illustrating values of $n_{TTI}$ and corresponding delays (assuming a transmission time interval for a wireless terminal is provided every 2 milliseconds)

DETAILED DESCRIPTION

Figure 1:
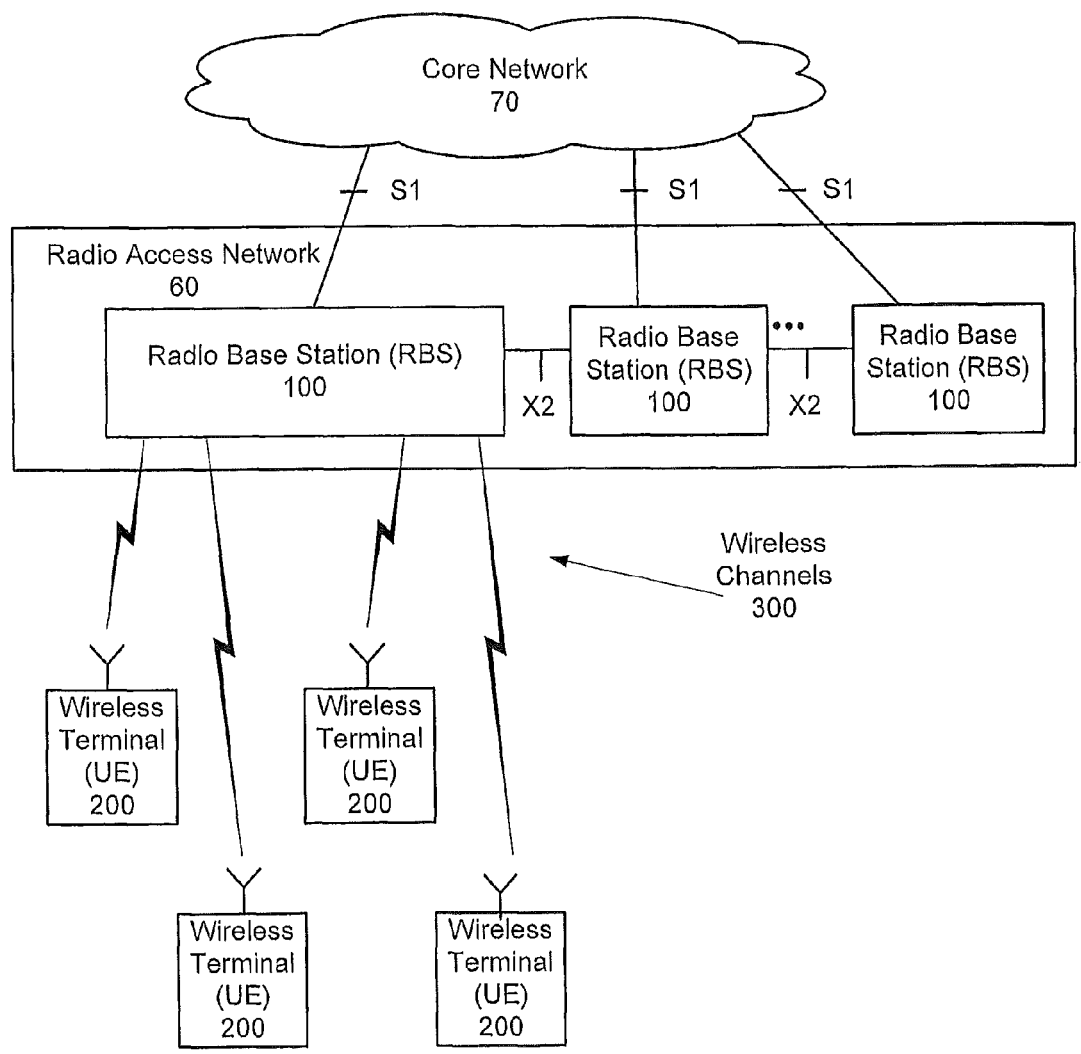
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a Radio Access Network (RAN) that communicates over radio communication channels with wireless terminals (also referred to as UEs). It will be understood, however, that the present invention is not limited to such embodiments and may be embodied generally in any type of communication network. As used herein, a wireless terminal or UE can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN may essentially be a radio access network using wideband code division multiple access (WCDMA) for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) WCDMA (Wideband Code Division Multiple Access) is used in this disclosure to exemplify embodiments of the invention, this should not be seen as limiting the scope of the invention to only these systems. These and other wireless systems, including LTE (Long Term Evolution), WiMax (Worldwide Interoperability for Microwave Access), UMB (Ultra Mobile Broadband), HSDPA (High-Speed Downlink Packet Access), GSM (Global System for Mobile Communications), etc., may benefit from exploiting embodiments of the present invention disclosed herein.

Also note that terminology such as base station (also referred to as radio base station, RBS, NodeB, eNodeB, Evolved Node B, etc.) and wireless terminal (also referred to as UE or User Equipment) should be considering non-limiting and does not imply a certain hierarchical relation between the two. In general a base station (e.g., a radio base station or "eNodeB") and a wireless terminal (e.g., a "UE") may be considered as examples of respective different communications devices that communicate with each other over a wireless radio channel. While embodiments discussed herein may focus on wireless transmissions in a uplink from a wireless terminal or UE to a radio base station RBS, embodiments of the invention may also be applied, for example, in the downlink.

FIG. 1 is a block diagram of a communication system that is configured to operate according to some embodiments of the present invention. An example RAN 60 is shown that may be a WCDMA RAN. The WCDMA RAN is a variant of a 3GPP RAN where radio base stations RBS 100 are connected directly to one or more core networks 70 rather than to radio network controller (RNC) nodes. In WCDMA, the functions of a radio network controller (RNC) node are performed by the radio base stations 100. The radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface(s) and with the core network(s) 70 through 51 interfaces, as is well known to one who is skilled in the art.

Figure 2:
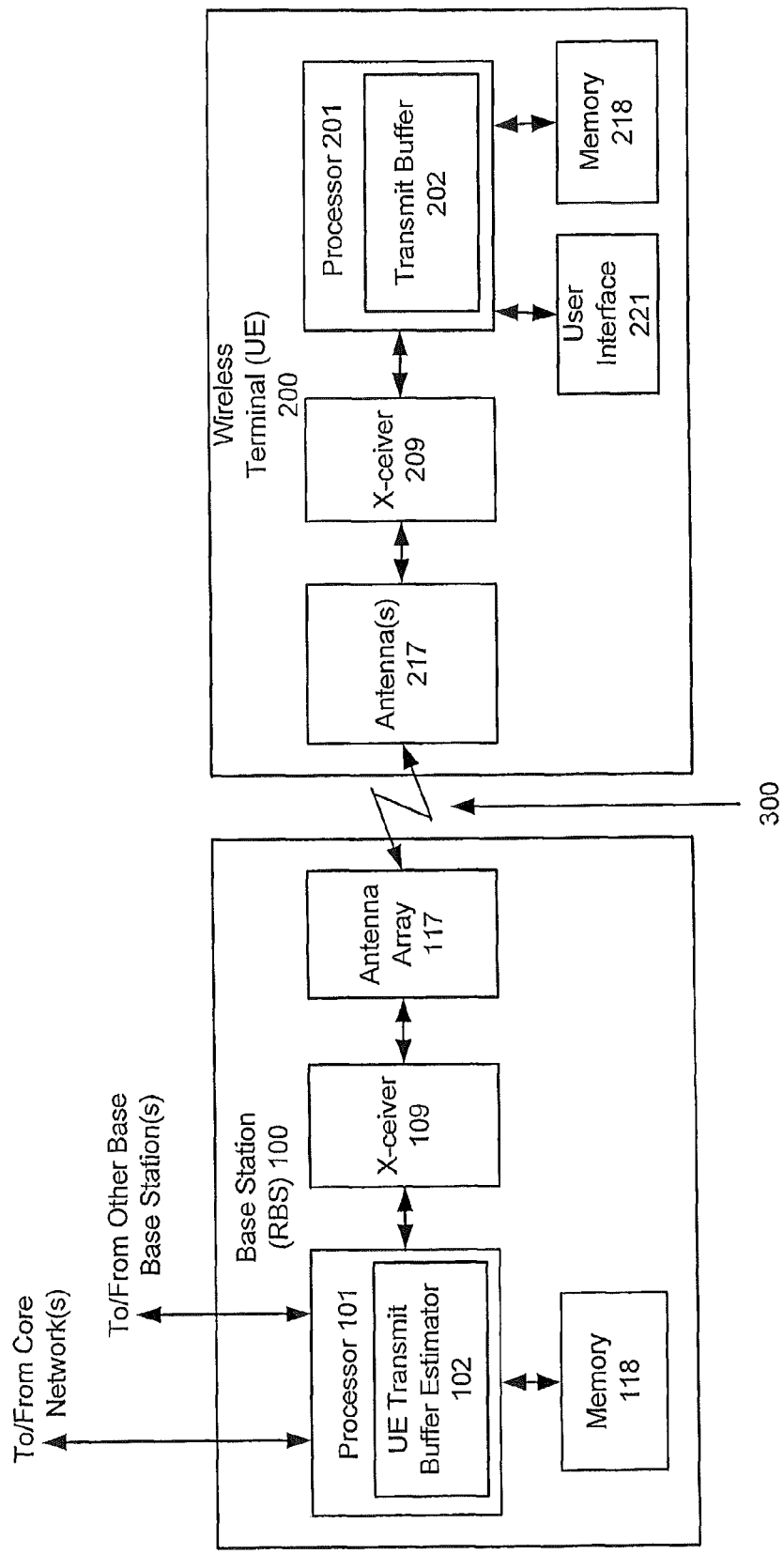
FIG. 2 is a block diagram of a base station and a wireless terminal (UE) in communication over a wireless channel according to some embodiments of FIG. 1.

FIG. 2 is a block diagram of a radio base station 100 and a wireless terminal 200 of FIG. 1 in communication over a wireless channel 300 according to some embodiments of the present invention. As shown, base station 100 may include transceiver 109 coupled between processor 101 and antenna(s) 117 (e.g., an antenna array including multiple antennas), and memory 118 coupled to processor 101. In addition, base station processor 101 may include a wireless terminal UE transmit buffer estimator. Moreover, wireless terminal 200 may include transceiver 209 coupled between antenna(s) 217 (e.g., an antenna array including multiple antennas) and processor 201, and user interface 221 (e.g., including one or more of a display, a touch sensitive screen, a keypad, a microphone, a speaker, etc.) and memory 218 may be coupled to processor 201. In addition, wireless terminal UE processor 201 may include a transmit buffer 202. Accordingly, base station 100 may transmit communications through transceiver 109 and antenna array 117 for reception at wireless terminal 200 through antenna(s) 217 and transceiver 209, and wireless terminal 200 may transmit communications though transceiver 209 and antenna(s) 217 for reception at base station 100 through antenna(s) 117 and transceiver 109.

Due to limited information available at base station 100 regarding a quantity/amount of data in UE transmit buffer 202 awaiting transmission, relatively efficient and/or fast uplink scheduling grants for enhanced uplink transmissions (e.g., uplink transmissions from wireless terminal 200 to base station 100 in accordance with 3GPP TS 25.321) may be difficult to achieve. Accordingly, a wireless terminal may be allowed to keep uplink scheduling grants too long resulting in underutilization of interference headroom, and/or a wireless terminal uplink scheduling grant may be released too soon resulting in increased latency. Base station processor 101 may thus include a transmit buffer estimator 102 to provide improved estimation of wireless terminal transmit buffer 202 to thereby provide improved uplink grant scheduling according to some embodiments of the present invention. Information generated by base station processor 101 transmit buffer estimator 102 may also be used to categorize different types of users according to behaviors in the radio access network which may be beneficial for scheduling and/or other functionalities of the base station.

As defined according to the 3GPP standard, the happy bit may be limited to one bit of data, and information provided by the happy bit may thus be inherently scarce. By using happy bits to generate/update estimates of a quantity/amount of data awaiting transmission in wireless terminal UE transmit buffer 202, transmit buffer estimator 202 may allow base station processor 101 to provide improved resource allocation, increased utilization of interference headroom, improved control, and/or reduced risk of overload. According to some embodiments, transmit buffer estimator 102 may provide estimates based on both relatively infrequent transmissions of scheduling information (including total E_DCH Buffer Status TEBS and UE Power Headroom UPH) and relatively frequent buffer indicator bits (e.g., happy bits) that are transmitted every Transmission Time Interval TTI.

A buffer indicator bit (e.g., a happy bit) may inherently convey information regarding a quantity/amount of data awaiting uplink transmission in a respective wireless terminal transmit buffer 202. According to embodiments of the present invention, buffer indicator bits may be used by transmit buffer estimator 202 to generate an estimate B of a quantity/amount of data in the transmit buffer 202 and/or to update the estimate $\hat{B}$ of a quantity/amount of data in the transmit buffer 202. According to some embodiments, the total E_DCH Buffer Status TEBS (and or other information from scheduling information transmissions) may be used by transmit buffer estimator 102 to generate a relatively precise estimate of a quantity/amount of data in the transmit buffer 202, and subsequent buffer indicator bits (e.g., happy bits) may be used by the transmit buffer indicator 102 together with a current transmit buffer delay condition (e.g., a Happy_Bit_Delay_Condition HBDC) and a current data rate (e.g., defined by a Transport Format Combination TFC or E_TFC) to update the estimate. According to some other embodiments, transmit buffer estimator 102 may generate and update estimates of a quantity/amount of data in transmit buffer 202 responsive to buffer indicator bits (e.g., happy bits), transmit buffer delay conditions, and data rates without using scheduling information transmissions. By more frequently updating estimates of data in a wireless terminal transmit buffer 202, base station processor 101 may be able to make improved scheduling decisions, to reduce a risk of underutilization of uplink scheduled resources, and/or to reduce latency due to premature grant ramp down. According to still other embodiments of the present invention, base station processor 101 may adaptively adjust a transmit buffer delay condition (e.g., a Happy_Bit_Delay_Condition HBDC), an $n_{TTI}$ value, and/or a transport format combination for wireless terminal 200 responsive to buffer indicator bits (e.g., happy bits) received from wireless terminal 200.

A Transport Format Combination TFC (e.g., E_TFC) is assigned by base station 100 to wireless terminal 200, and the TFC defines a quantity of data (e.g., a number of data bits) that may be transmitted by wireless terminal 200 over a wireless uplink channel to base station 100 during a Transmission Time Interval TTI. For example, base station 100 may assign a first Transport Format Combination TFC (defining a first quantity of data) to wireless terminal 200 when a connection (e.g., communication, call, session, link, etc.) is initially established between base station 100 and wireless terminal 200, and subsequent TFCs may be assigned during the connection to change the quantity of data, for example, to adapt to changing channel conditions. In addition, a transmit buffer delay condition (e.g., HBDC) for wireless terminal 200 may be defined by a value of $n_{TTI}$ (defining a number of TTIs for a transmit buffer delay condition) that is assigned by base station 100 and the current TFC such that the transmit buffer delay condition may be calculated as the product of $n_{TTI}$ and TFC (e.g., HBDC=$n_{TTI}$*E_TFC).

As discussed above, wireless terminal 202 may generate a buffer indicator bit having an unhappy status if all of the following three criteria are met:
 (1) wireless terminal 200 is transmitting as much scheduled data (defined by TFC or E_TFC) as allowed by the current Serving_Grant on that frequency; and
 (2) wireless terminal 200 has enough power available to transmit at a higher data rate on that frequency; and
 (3) an amount of data in the wireless terminal transmit buffer 202 is greater than the current transmit buffer delay condition (e.g., HBDC) defined as the product of $n_{TTI}$ and TFC.

The unhappy status is thus generated when the wireless terminal has the ability to transmit at a higher data rate, and an amount of data in the transmit buffer exceeds the current transmit buffer delay condition. Accordingly, assignment of a new TFC defining a higher data rate may be justified for wireless terminal 200 when an unhappy status is generated.

Wireless terminal 202 may generate a buffer indicator bit having a happy status if any of the following criteria is not met:
 (1) wireless terminal 200 is transmitting as much scheduled data (defined by TFC or E_TFC) as allowed by the current Serving_Grant on that frequency; or
 (2) wireless terminal 200 has enough power available to transmit at a higher data rate on that frequency; or (3) an amount of data in the wireless terminal transmit buffer 202 is greater than the current transmit buffer delay condition (e.g., HBDC) defined as the product of $n_{TTI}$ and TFC.

The happy status is thus generated if wireless terminal 200 is not using all uplink capacity current allocated to it, or if wireless terminal 200 does not have the ability (e.g., available power) to transmit at a higher data rate, or if an amount of data in transmit buffer 202 does not exceed a current delay condition. Accordingly, assignment of a new TFC defining a higher data rate may not be justified for wireless terminal 200 when a happy status is generated.

Because base station processor 101 assigns and thus knows both the $n_{TTI}$ and E_TFC currently assigned to wireless terminal 200, transmit buffer estimator 102 can estimate a minimum amount of data B in transmit buffer 202 when a buffer indicator bit (e.g., a happy bit) having an unhappy status is received from wireless terminal 200. When a buffer indicator bit having an unhappy status is received from wireless terminal 200, transmit buffer estimator 102 may estimate a current amount of data $\hat{B}$ in transmit buffer 202 as follows:

$$\hat{B}_{k-1}{}^a = \hat{D}_k = n_{TTI} \times E\_TFC_k, \quad \text{Equation 1}$$

where k represents the time or transmission time interval. Stated in other words, transmit buffer estimator 102 can determine that transmit buffer 202 includes at least an amount of data defined by the transmit buffer delay condition when an unhappy status is indicated by a buffer indicator bit.

When a transmit buffer indicator (e.g., a happy bit) having a happy status is received from wireless terminal 200, transmit buffer estimator 102 may reduce the previous transmit buffer estimate $\hat{B}_k$ by the amount of data (defined by the current TFC) received with the transmit buffer indicator during the most recent TTI. When a buffer indicator bit having a happy status is received from wireless terminal 200, transmit buffer indicator 102 may thus update the estimate of data $\hat{B}$ in transmit buffer 202 as follows:

$$\hat{B}_{k+1}{}^b = \hat{B}_k - E\_TFC_k \quad \text{Equation 2}$$

Stated in other words, transmit buffer estimator 102 can update the estimate of the transmit buffer when a buffer indicator bit has a happy status by reducing the previous transmit buffer estimate by the amount of data transmitted during a transmission time interval.

Transmit buffer estimator 102 may thus generate/update estimates of transmit buffer 202 responsive to buffer indicator bits (e.g., happy bits) as discussed above with respect to Equations 1 and 2 provided that the data rate determined by the TFC (e.g., E_TFC) remains unchanged or increases. In the event that the data rate is reduced and a buffer indicator bit having an unhappy status is received, however, an actual amount of data in transmit buffer 202 may be significantly greater than that estimated according to equation 1 because a significant amount of data may have been included in transmit buffer 202 before the reduction in data rate. Stated in other words, a minimum amount of data B calculated based on a previous higher data rate may be significantly greater than a minimum amount of data $\hat{B}$ calculated based on a current lower data rate. When a buffer indicator bit having an unhappy state is received from wireless terminal 200, transmit buffer estimator 102 may thus choose the greater of the estimates resulting from equations 1 and 2 as set forth below:

$$\hat{B}_{k+1} = \max(\hat{B}_{k-1}{}^a, \hat{B}_{k+1}{}^b) \quad \text{Equation 3}$$

Operations implementing buffer estimation according to Equations 1, 2, and 3 according to some embodiments are discussed in below with respect to the flow charts of FIGS. 3A and 3B.

Figure 3A:
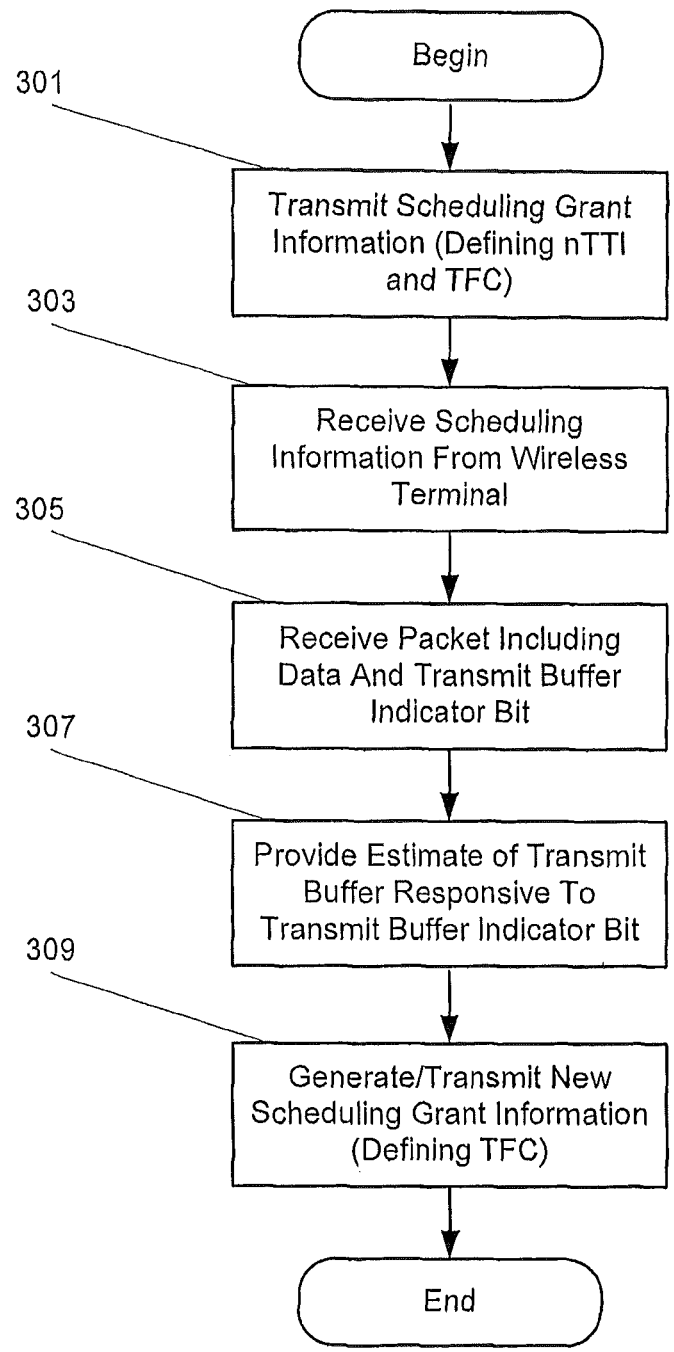

According to embodiments shown in FIG. 3A, operations of base station 100 (a node of radio access network 60) are shown for communications with wireless terminal 200 that provides transmit buffer 202 for data to be transmitted to and received at node 100 during uplink transmission time intervals. More particularly, wireless terminal may be configured to transmit packets of the data from transmit buffer 202 to node 100 during respective transmission time intervals, and to provide buffer indicator bits (e.g., happy bits) with respective packets of the data during the respective transmission time intervals.

At block 301, base station processor 101 may be configured to generate initial scheduling grant information defining a number of transmission time intervals for a transmit buffer delay condition (e.g., $n_{TTI}$) and defining a first quantity of data allowed in a packet of a transmission time interval (e.g., TFC or E_TFC), and base station 101 may transmit the initial scheduling grant information through transceiver 109 to wireless terminal 200, for example, when a PS RAB (or Packet Switched Radio Access Bearer) is set up for a connection (e.g., communication, call, session, link, etc.). When a connection (e.g., communication, call, session, link, etc.) is first established between base station 100 and wireless terminal 200, for example, base station processor 101 may transmit information defining an initial $n_{TTI}$ and an initial quantity of data allowed in a packet of a TTI for uplink transmissions from wireless terminal 200 to base station 100.

During the course of the connection (e.g., communication, call, session, link, etc.), wireless terminal 200 may transmit scheduling information (e.g., including Highest Priority Logical Channel ID HLID, Total E-DCH Buffer Status TEBS, Highest Priority Logical Channel Buffer Status HLBS, and/or UE Power Headroom UPH), and the wireless terminal scheduling information may be received through transceiver 109 at base station processor 101 at block 303. Processor 101, for example, may use this scheduling information to calculate/determine/estimate a quantity of data in wireless terminal transmit buffer 202 (e.g., using the Total E-DCH Buffer Status TEBS). Base station processor 101 may thus use this scheduling information to estimate a quantity of data in transmit buffer 202 with a relatively high level of precision. Wireless terminal 200, however, may provide such scheduling information relatively infrequently. According to some embodiments of the present invention, operations of block 303 may be provided as discussed below with respect to blocks 351 and 353 of FIG. 3B. According to other embodiments, operations of block 303 may be omitted so that scheduling information is not considered by base station processor 101 when estimating wireless terminal transmit buffer 202.

At block 305, base station processor 101 may receive a packet during a transmission time interval from wireless terminal 200 through transceiver 109, and the packet may include data from transmit buffer 202 and a buffer indicator bit (e.g., a happy bit). At block 307, processor 101 may provide an estimate of a quantity of data in wireless terminal transmit buffer 202 responsive to a status of the buffer indicator bit. For example, processor 101 may update a previous estimate determined using a buffer status (e.g., TEBS) provided by wireless terminal 200. According to other embodiments, processor 101 may provide estimates of quantities of data in transmit buffer 202 without using buffer status information (e.g., TEBS), for example, using only buffer indicator bits received with each data packet. According to some embodiments, operations of block 307 may be provided as discussed below with respect to blocks 357, 359, 361, and 363 of FIG. 3B.

At block 309, processor 101 may generate information defining a second quantity (different than the first quantity) of data allowed in a packet of a transmission time interval (TFC) responsive to the estimate of the transmit buffer 202 provided at block 307. Base station processor 101 may thus generate/update estimates of quantities of data in wireless terminal transmit buffer 202 using a single buffer indicator bit that is provided with each data packet transmitted by wireless terminal, and these estimates of the wireless transmit buffer 202 may be used by processor 101 to provide improved scheduling grants over the course of a connection (e.g., communication, call, session, link, etc.). According to some embodiments, operations of block 309 may be provided as discussed below with respect to blocks 365 and 367.

According to embodiments shown in FIG. 3B, base station processor 101 may continuously update estimates of quantities of data in wireless terminal transmit buffer 202 over the course of a connection (e.g., communication, call, session, link, etc.). Operations FIG. 3B having the same reference number as corresponding operations of FIG. 3A may be the same as discussed above with respect to FIG. 3A.

At block 301, base station processor 101 may be configured to generate initial scheduling grant information at the beginning of a connection (e.g., communication, call, session, link, etc.) between base station 100 and wireless terminal 200, for example, when a PS RAB (or Packet Switched Radio Access Bearer) is set up. The initial scheduling grant information may define a number of transmission time intervals for a transmit buffer delay condition (e.g., $n_{TTI}$) and a first quantity of data allowed in a packet of a transmission time interval (e.g., TFC). Moreover, base station processor 101 may transmit the initial scheduling grant information through transceiver 109 to wireless terminal 200.

At block 351, base station processor 101 may receive scheduling information from wireless terminal 200 (through transceiver 109), with the scheduling information including buffer status and power headroom information for wireless terminal 200. If/when such information is received, base station processor 101 may generate a first estimate of the quantity of data in the transmit buffer responsive to the scheduling information including the buffer status. During the course of the connection (e.g., communication, call, session, link, etc.), for example, wireless terminal 200 may transmit scheduling information (e.g., including Highest Priority Logical Channel ID HLID, Total E-DCH Buffer Status TEBS, Highest Priority Logical Channel Buffer Status HLBS, and/or UE Power Headroom UPH). Processor 101, for example, may use this scheduling information to calculate/determine/estimate a quantity of data in wireless terminal transmit buffer 202 (e.g., using the Total E-DCH Buffer Status TEBS). Base station processor 101 may thus use this scheduling information to estimate a quantity of data in transmit buffer 202 with a relatively high level of precision. Wireless terminal 200, however, may provide such scheduling information relatively infrequently. According to other embodiments of the present invention, blocks 351 and 353 may be omitted so that transmit buffer estimates are determined without such information.

At block 355, base station processor 101 may determine if a data packet has been received from wireless terminal 200 during a transmission time interval. Processor 101 may thus loop through operations of blocks 351, 353, and 355 until a data packet is received at processor 101 from wireless terminal 200 through transceiver 109. Because data packets may be received more frequently (at block 355) than scheduling information (at block 351), estimates of wireless terminal transmit buffer 202 may be performed more frequently responsive to buffer indicator bits included with data packets.

When a data packet is received at block 355 (through transceiver 109), processor 101 may determine a status of the transmit buffer indicator bit at block 357. Responsive to a first status (e.g., a happy status) of the buffer indicator bit at block 359, processor 101 at block 363 may generate/update an estimate of the quantity of data in the transmit buffer as a first estimate of the quantity of data in the transmit buffer less a quantity of data allowed in a packet of a transmission time interval (as discussed above with respect to Equation 2). Responsive to a second status (e.g., an unhappy status) of the buffer indicator bit at block 359, processor 101 at block 361 may generate/update an estimate of the quantity of data in the transmit buffer as the greater of a quantity of data defining a transmit buffer delay condition and a first estimate of the quantity of data in the transmit buffer less a quantity of data allowed in a packet of a transmission time interval (as discussed above with respect to Equations 1, 2, and 3).

Based on the current estimate of the wireless terminal transmit buffer 202, processor 101 may determine at block 365 whether to update a quantity of data allowed in a packet of a transmission time interval (e.g., TFC or E_TFC). If the quantity of data allowed in a packet of a transmission time interval is to be updated at block 365, processor 101 may generate/transmit new scheduling grant information at block 367 defining a new quantity of data (different than the previous quantity of data) allowed in a packet. Otherwise, uplink transmissions from wireless terminal 200 to base station 100 may continue without changing the quantity of data allowed in a packet. Operations of FIG. 3B may thus continue for a connection (e.g., communication, call, session, link, etc.) until termination of the connection (e.g., communication, call, session, link, etc.) at block 381.

According to some embodiments discussed above with respect to FIG. 3B, base station processor 101 may update/change a quantity of data allowed in an uplink packet of a transmission time interval (e.g., TFC or E_TFC) over the course of a connection (e.g., communication, call, session, link, etc.) responsive to the buffer indicator bit while the number of transmission time intervals defining the delay condition (e.g., $n_{TTI}$) remain constant over the course of the connection (e.g., communication, call, session, link, etc.). According to some other embodiments (discussed in greater detail below with respect to FIGS. 6A and 6B), base station processor 101 may change/update a quantity of data allowed in an uplink packet (e.g., TFC or E_TFC), and base station processor 101 may change a number of transmission time intervals defining a delay condition (e.g., $n_{TTI}$) over the course of a connection (e.g., communication, call, session, link, etc.) responsive to status of buffer indicator bits.

According to embodiments of FIGS. 3A and 3B, the quantity of data defining the transmit buffer delay condition (e.g., a happy_bit_delay_condition or HBDC) may be calculated as a product (e.g., HBDC=$n_{TTI}$*E_TFC) of the first quantity of data allowed in a packet (e.g., E_TFC) and the number of transmission time intervals for the transmit buffer delay condition (e.g., $n_{TTI}$). By way of example, the buffer indicator bit may be a happy bit as defined according to 3GPP standards, and/or the transmit buffer delay condition may be a Happy_Bit_Delay_Condition defined according to 3GPP standards.

The time varying nature of the uplink data rate defined by different Transport Format Combinations (e.g., different E_TFC) assigned over the course of a connection (e.g., communication, call, session, link, etc.) may allow estimation of buffer sizes having different lengths. For example, it may be possible to distinguish between large buffers in wireless terminals operating with relatively good channel conditions and small buffers in wireless terminals operating with relatively poor channel conditions. Performance of transmit buffer estimation in accordance with Equations 1, 2, and 3 will be discussed in greater detail below with respect to FIGS. 4A-C and 5A-C with $n_{TTI}$ fixed for a connection (e.g., communication, call, session, link, etc.). Stated in other words, $n_{TTI}$ may be assigned by radio base station 100 at the beginning of a connection (e.g., communication, call, session, link, etc.), and the $n_{TTI}$ may remain unchanged throughout the connection (e.g., communication, call, session, link, etc.). A different $n_{TTI}$, however, may be assigned for a next connection (e.g., communication, call, session, link, etc.).

Figure 4A:
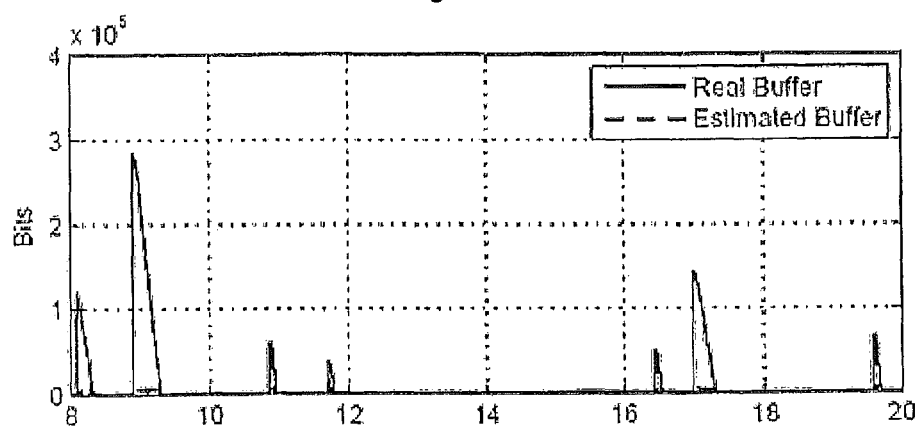
FIGS. 4A, 4B, and 4C are graphs illustrating simulation results estimating buffer sizes for $n_{TTI}$ of 3 according to some embodiments.
Figure 4B:
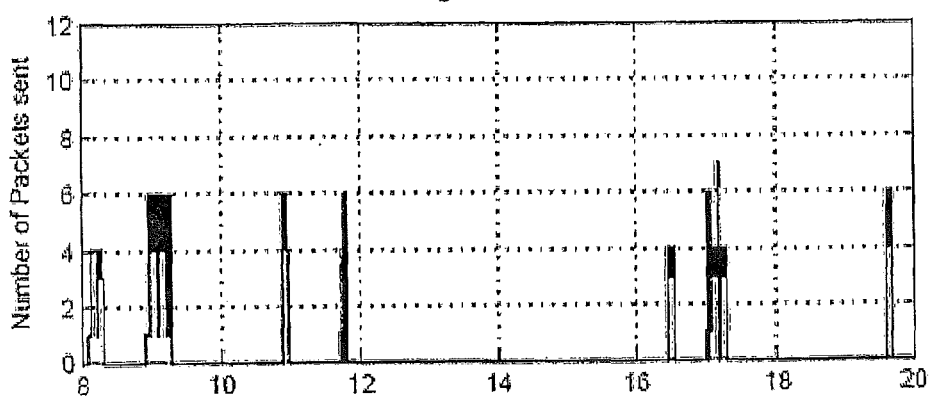
Figure 4C:
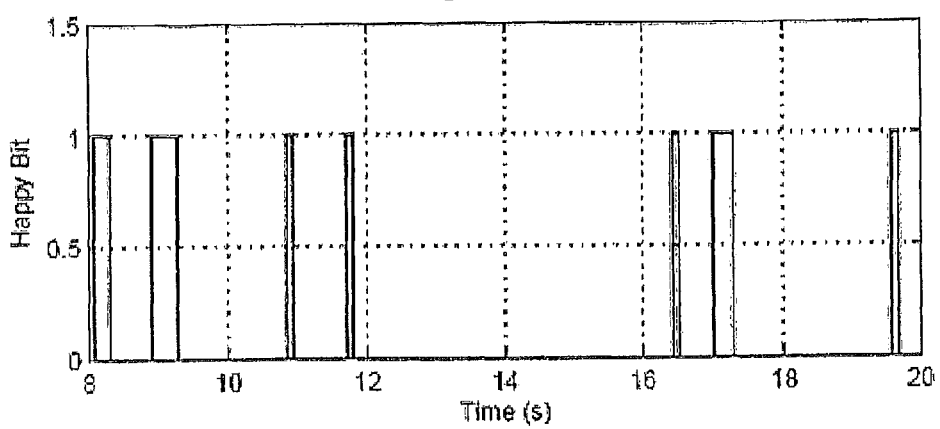

FIGS. 4A, 4B, and 4C respectively illustrate simulation results estimating buffer sizes according to Equations 1, 2, and 3 using fixed $n_{TTI}$ according to some embodiments of the present invention wherein $n_{TTI}$ is relatively small. The results of FIGS. 4A-C are generated based on a fixed $n_{TTI}$ with $n_{TTI}$=3. FIG. 4A shows numbers of bits in transmit buffer 202, FIG. 4B shows packet transmissions (with each packet being transmitted during a respective Transmission Time Interval), and FIG. 4C shows the happy bit status for each packet transmission. Note that the estimated buffer size (shown in dashed lines) in FIG. 4A may not accurately follow the actual (simulated) buffer size (shown in solid lines) with a relatively small $n_{TTI}$.

Figure 5A:
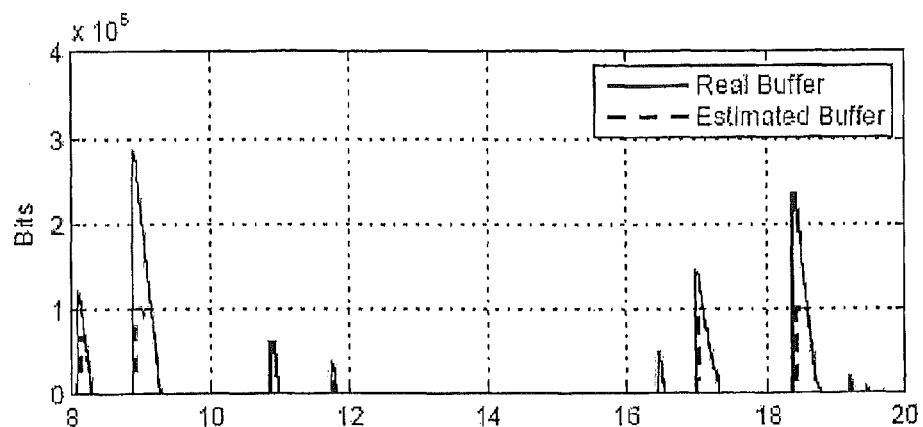
FIGS. 5A, 5B, and 5C are graphs illustrating simulation results estimating buffer sizes for $n_{TTI}$ of 50 according to some embodiments.
Figure 5B:
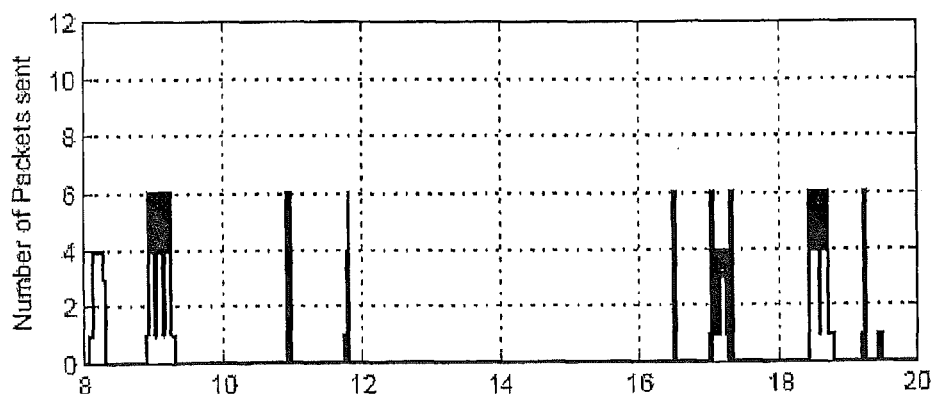
Figure 5C:
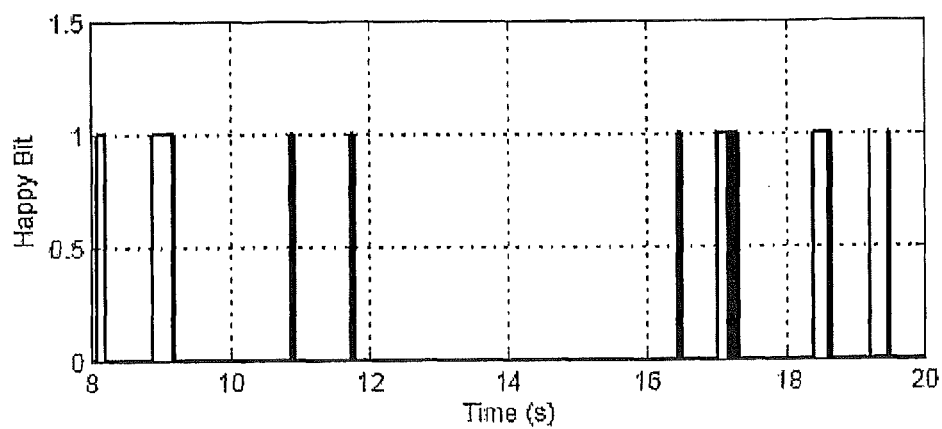

FIGS. 5A, 5B, and 5C respectively illustrate simulation results estimating buffer sizes according to Equations 1, 2, and 3 using fixed $n_{TTI}$ according to some embodiments of the present invention where $n_{TTI}$ is relatively small. The results of FIGS. 5A-C are generated based on a fixed $n_{TTI}$ with $n_{TTI}$=50. FIG. 5A shows numbers of bits in transmit buffer 202, FIG. 5B shows packet transmissions (with each packet being transmitted during a respective Transmission Time Interval), and FIG. 5C shows the happy bit status for each packet transmission. Note that the estimated buffer size (shown in dashed lines) in FIG. 4A may more accurately follow the actual (simulated) buffer size (shown in solid lines) for relatively large buffers with a relatively large $n_{TTI}$. As shown in FIG. 5A for relatively large $n_{TTI}$, estimated buffer sizes (shown in dashed lines) may be used to distinguish wireless terminals with relatively large buffers (e.g., at times 8.2, 9, 17, and 18.5) from wireless terminals with relatively small buffers, estimates of which are not visible (e.g., at times 11 and 11.8).

Accordingly, FIGS. 5A-C show that a longer $n_{TTI}$ may allow better estimation of buffer sizes for wireless terminals with relatively larger buffer sizes. Some relatively smaller buffer sizes, however, may be missed (e.g., at time t=11), because after requesting an uplink grant, the wireless terminal may reach a happy status immediately upon receiving a first uplink serving grant. On the other hand, some relatively small transmit buffers of wireless terminals operating with relatively poor uplink channel conditions may also be identifiable (e.g., at times t=11.8 and/or t=19). Note that once the buffer size has been estimated, then that buffer may be trackable. Base station processor 101 (and/or a scheduler thereof) may thus be better able to predict current/future transmit buffer sizes at wireless terminals communicating therewith.

As discussed above with respect to FIGS. 3A-B, 4A-C, and 5A-C, the number of transmission time intervals $n_{TTI}$ used to calculate the transmit buffer delay condition (e.g., Happy_Bit_Delay_Condition) may be fixed for a connection (e.g., communication, call, session, link, etc.) between wireless terminal 200 and base station 100. Stated in other words, base station 100 may assign a fixed $n_{TTI}$ to wireless terminal 200 when a connection (e.g., communication, call, session, link, etc.) is initiated, and $n_{TTI}$ may remain unchanged for the duration of the connection (e.g., communication, call, session, link, etc.).

According to some other embodiments, base station 100 may assign an initial $n_{TTI}$ value to wireless terminal 200 when a connection (e.g., communication, call, session, link, etc.) is initiated, and base station 100 may assign new $n_{TTI}$ values to wireless terminal 200 over the course of the connection (e.g., communication, call, session, link, etc.). By varying the $n_{TTI}$ over the course of a connection (e.g., communication, call, session, link, etc.) to provide adaptive $n_{TTI}$, transmit buffer estimator 102 may be better able to estimate sizes of wireless terminal transmit buffer 202.

Several factors may influence decisions regarding design of strategies to adapt $n_{TTI}$ over the course of a connection (e.g., communication, call, session, link, etc.). At the beginning of a transmission of a packet over a TTI, wireless terminal 200 may have a relatively/very low serving grant providing a relatively/very low data rate (e.g., determined by E_TFC assigned by base station 100), because the transmission is just beginning and/or because the uplink channel conditions are relatively poor. The serving grant, however, may change rapidly at the next TTI responsive to a new E_TFC assigned by base station 100. Accordingly, base station processor 101 may suppress changing $n_{TTI}$ if other uplink transmission parameters (e.g., E_TFC) are changing or have changed recently.

Base station processor 101, for example, may verify that the Transport Format Combination TFC has not changed from the preceding TTI to the present TTI (e.g., that $E\_TFC_k = E\_TFC_{k-1}$). If the TFC has changed, then $n_{TTI}$ should be maintained unchanged for the current TTI. If the TFC is unchanged from a preceding TTI, then base station processor 101 may consider changing $n_{TTI}$. Provided that the TFC is unchanged, base station processor 101 may increase $n_{TTI}$ responsive to a buffer indicator bit having an unhappy status (e.g., an unhappy bit), or base station processor 101 may decrease $n_{TTI}$ responsive to a buffer indicator bit having a happy status (e.g., a happy bit). Providing an adaptive $n_{TTI}$ that varies over a connection (e.g., communication, call, session, link, etc.) may result in a change to existing 3GPP standardized signaling. Operations providing an adaptive $n_{TTI}$ are discussed in greater detail below with respect to the flow charts of FIGS. 6A and 6B.

Figure 6A:
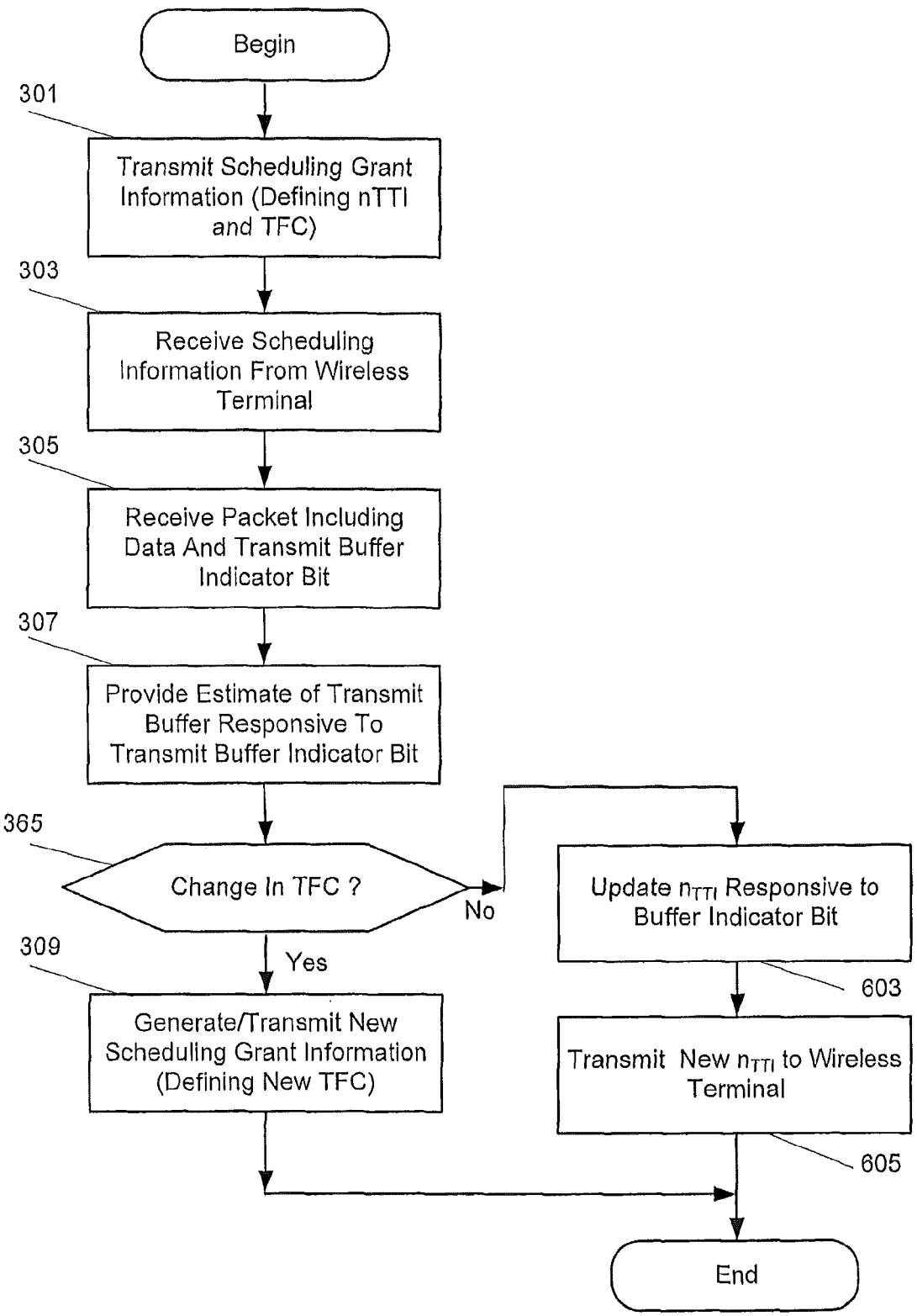

According to embodiments shown in FIG. 6A, operations of base station 100 (a node of radio access network 60) are shown for communications with wireless terminal 200 that provides transmit buffer 202 for data to be transmitted to and received at node 100 during uplink transmission time intervals. More particularly, wireless terminal may be configured to transmit packets of the data from transmit buffer (202) to node (100) during respective transmission time intervals, and to provide buffer indicator bits (e.g., happy bits) with respective packets of the data during the respective transmission time intervals.

Operations of FIG. 6A identified by reference numbers used above with respect to FIGS. 3A and/or 3B may be the same as corresponding operations of FIGS. 3A and/or 3B, and repetitive discussion thereof may be omitted for the sake of conciseness. Operations of blocks 301, 303, 305, 307, 365, and 309 may thus be the same as discussed above with respect to FIGS. 3A and/or 3B, and repetitive discussion thereof may be omitted. In FIG. 6A, however, base station processor 101 may modify a quantity of data allowed in an uplink packet of a transmission time interval (e.g., E_TFC) from wireless terminal 200 and a number of transmission time intervals for a transmit buffer delay condition (e.g., $n_{TTI}$) responsive to transmit buffer indicator bits received with data packets from wireless terminal 200.

At block 365, processor 101 may determine whether to update a quantity of data allowed in a packet of a transmission time interval (e.g., TFC or E_TFC) responsive to the current estimate of the wireless terminal transmit buffer 202. If the quantity of data allowed in a packet of a transmission time interval is to be updated at block 365, processor 101 may generate/transmit new scheduling grant information at block 367 defining a new quantity of data (different than the previous quantity of data) allowed in a packet as discussed above with respect to FIGS. 3A and/or 3B. Otherwise, processor 101 may update a number of transmission time intervals defining the delay condition for transmit buffer 202 at block 603 responsive to a status of the buffer indicator bit, and at block 605, processor 101 may transmit the updated number of transmission time intervals defining the delay condition to wireless terminal 200 at block 605. According to some embodiments, operations of block 603 may be performed as discussed below with respect to blocks 667, 669, and 671 of FIG. 3B.

Accordingly, processor 101 may update either the quantity of data allowed in an uplink data packet (e.g., TFC or E_TFC) or the number of transmission time intervals defining a transmit buffer delay condition (e.g., $n_{TTI}$) responsive to any one transmit buffer indicator bit received from wireless terminal 200. By updating the number of transmission time intervals defining the transmit buffer delay condition responsive to buffer indicator bits, estimates of wireless terminal transmit buffer 202 may be improved, and such estimates may be further improved by allowing only one of the quantity of data allowed in an uplink data packet or the number of transmission time intervals defining a transmit buffer delay condition to change responsive to any given transmit buffer indicator bit.

According to some embodiments of FIG. 6B, operations of blocks 301, 303, 305, 307, 365, and 309 may the same as corresponding operations of FIGS. 3A, 3B, and 6A, and repetitive discussion thereof may be omitted for the sake of conciseness. In FIG. 6B, base station processor 101 may update the number of transmission time intervals defining a transmit buffer delay condition (e.g., $n_{TTI}$) responsive to a transmit buffer indicator bit if the quantity of data allowed in an uplink data packet is not changed responsive to the transmit buffer indicator bit at block 365. For example, base station processor 101 may increase the number of transmission time intervals defining the transmit buffer delay condition (e.g., $n_{TTI}$) responsive to a first status (e.g., a happy status) of the transmit buffer indicator bit at blocks 667 and 671, or base station processor 101 may decrease the number of transmission time intervals defining the transmit buffer delay condition (e.g., $n_{TTI}$) responsive to a second status (e.g., an unhappy status) of the transmit buffer indicator bit at blocks 667 and 669.

Base station processor 101 may thus change/update a quantity of data allowed in an uplink packet (e.g., TFC or E_TFC), and base station processor 101 may change a number of transmission time intervals defining a delay condition (e.g., $n_{TTI}$) over the course of a connection (e.g., communication, call, session, link, etc.) responsive to status of buffer indicator bits. The updated number of transmission time intervals defining a delay condition may then be transmitted to wireless terminal 200 at block 605, and operations of FIG. 6B may be repeated until the connection (e.g., communication, call, session, link, etc.) is terminated at block 681.

According to embodiments of FIGS. 6A and 6B, the quantity of data defining the transmit buffer delay condition (e.g., a happy_bit_delay_condition or HBDC) may be calculated as a product (e.g., HBDC=$n_{TTI}$*E_TFC) of the first quantity of data allowed in a packet (e.g., E_TFC) and the number of transmission time intervals for the transmit buffer delay condition (e.g., $n_{TTI}$). By way of example, the buffer indicator bit may be a happy bit as defined according to 3GPP standards, and/or the transmit buffer delay condition may be a Happy_Bit_Delay_Condition defined according to 3GPP standards.

FIGS. 7A, 7B, 7C, and 7D are graphs illustrating illustrate simulation results estimating buffer sizes according to Equations 1, 2, and 3 using adaptive $n_{TTI}$ according to some embodiments of the present invention. More particularly, $n_{TTI}$ values and/or delay conditions from Table 1 of FIG. 8 may be adaptively selected over the course of a connection (e.g., communication, call, session, link, etc.). As shown in the table of FIG. 8, for example, a value of the HBDC may take one of 8 values between (and including) 2 milliseconds (ms) and 1000 milliseconds (ms), and these HBDCs may be mapped to values of $n_{TTI}$ as shown in Table 1 of FIG. 8. For example, values of $n_{TTI}$ (a number of TTIs) may take one of eight values including: 1 corresponding to a 2 millisecond delay condition; 5 corresponding to a 10 millisecond delay condition; 10 corresponding to a 20 millisecond delay condition; 25 corresponding to a 50 millisecond delay condition; 50 corresponding to a 100 millisecond delay condition; 100 corresponding to a 200 millisecond delay condition; 250 corresponding to a 500 millisecond delay condition; and 500 corresponding a 1000 millisecond delay condition. Different HBDCs, $n_{TTI}$s, and/or indicators thereof (e.g., as indicated by the "Levels" of FIG. 8) may be transmitted from the radio base station to the wireless terminal over the course of the connection (e.g., communication, call, session, link, etc.) is set up as discussed above with respect to FIGS. 6A and 6B. While FIG. 8 provides examples of delay conditions and $n_{TTI}$ values for purposes of the simulations of FIGS. 7A-D, other delay conditions and/or $n_{TTI}$ values may be used.

Figure 7A:
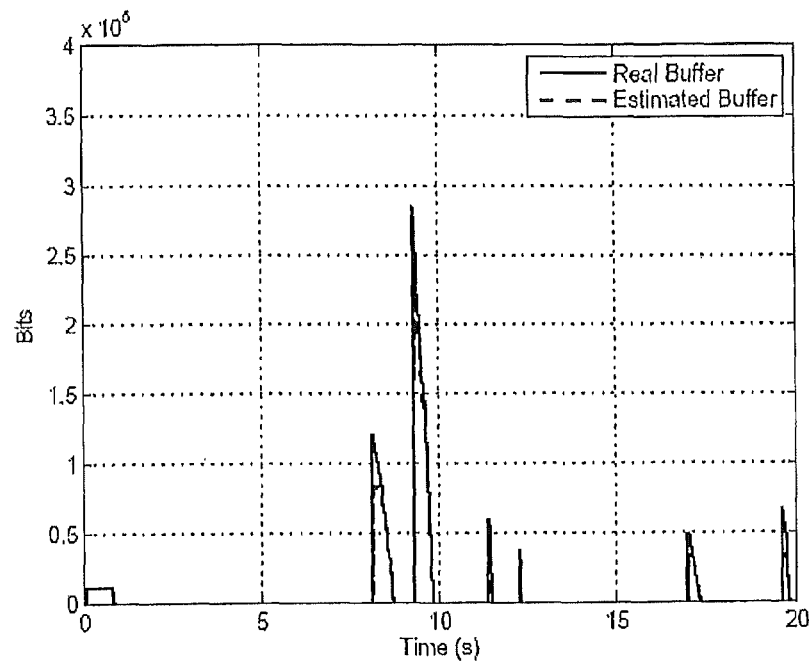
FIGS. 7A, 7B, 7C, and 7D are graphs illustrating simulation results estimating buffer sizes using adaptive nTTI according to some embodiments.
Figure 7B:
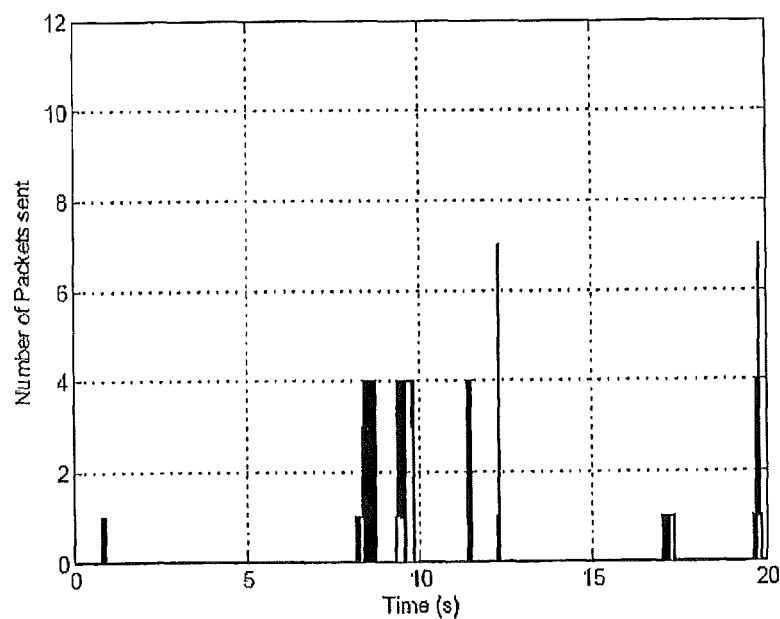
Figure 7C:
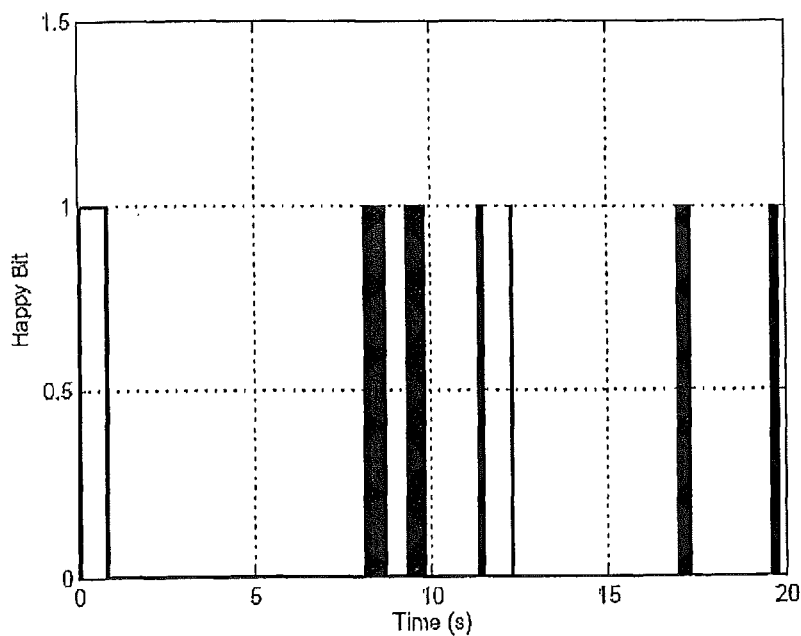
Figure 7D:
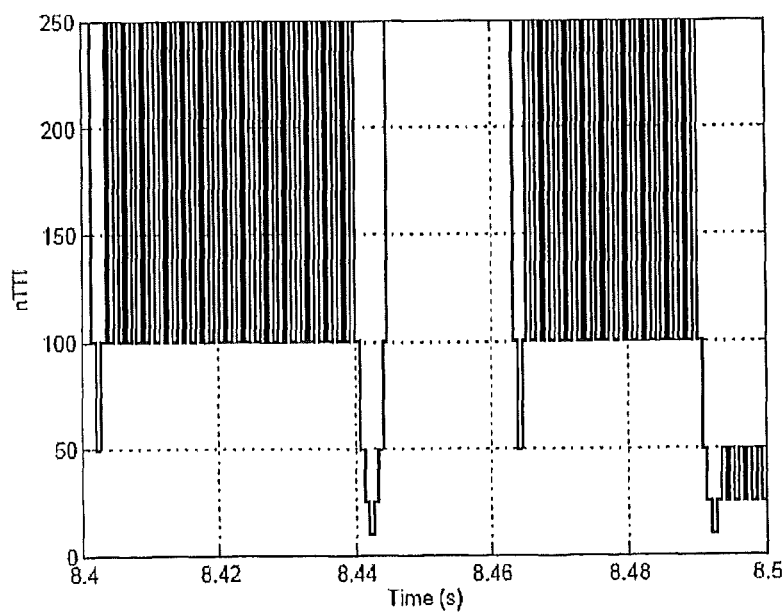

FIG. 7A shows numbers of bits in transmit buffer 202, FIG. 7B shows packet transmissions (with each packet being transmitted during a respective Transmission Time Interval), FIG. 7C shows happy bit status for each packet transmission, and FIG. 7D shows values of the adaptive $n_{TTI}$ over the course of a connection (e.g., communication, call, session, link, etc.). As shown in FIG. 7A, various sizes of transmit buffer 202 may be visible as estimates shown in dashed lines. Accordingly, transmit buffer estimator 102 may be able to generate more accurate estimates of varying amounts of data in transmit buffer 202 by adapting $n_{TTI}$ responsive to buffer indicator bits (e.g., responsive to 3GPP happy bits) received from wireless terminal 200.

Figure 9:
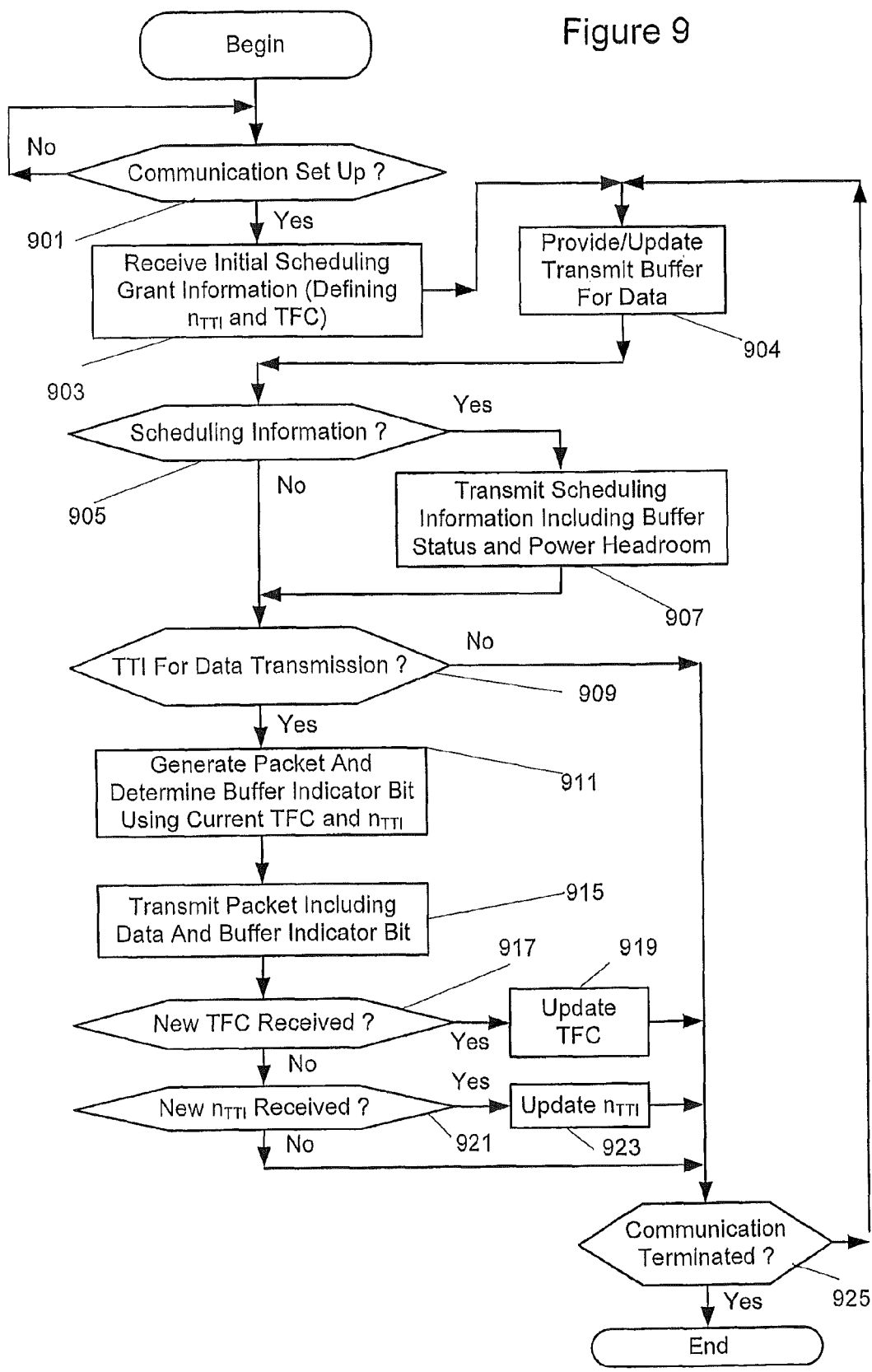
FIG. 9 is a flow chart illustrating wireless terminal operations according to some embodiments.

FIG. 9 illustrates operations of wireless terminal 200 corresponding to base station operations of FIG. 6B. To set up a connection (e.g., communication, call, session, link, etc.) at block 901, wireless terminal 200 processor 201 may receive (through transceiver 209) initial scheduling grant information at block 903 including the number of transmission time intervals defining a transmit buffer delay condition and a quantity of data allowed in an uplink data packet. The information received at block 903 may correspond to that transmitted by base station at block 301 of FIG. 6B, for example, when a PS RAB (or Packet Switched Radio Access Bearer) is set up. At block 904, wireless terminal processor 201 may provide/update a transmit buffer 202 for data to be transmitted during transmission time intervals. Processor 201, for example, may provide data to transmit buffer 201 continuously and/or in chunks, and data from transmit buffer 201 may be transmitted in uplink data packets during respective transmission time intervals.

When processor 201 generates scheduling information at block 905, processor 201 may transmit the scheduling information at block 907. The scheduling information of blocks 905 and 907 may correspond to the scheduling information discussed above with respect to blocks 303, 351, and 353 of FIGS. 3A, 3B, 6A, and 6D. The scheduling information, for example, may include: a 4 bit Highest Priority Logical Channel ID (HLID) field; a 5 bit Total E-DCH Buffer Status (TEBS) field; a 4 bit Highest priority Logical channel Buffer Status (HLBS) field; and a 5 bit UE Power Headroom (UPH) field. The scheduling information, however, may be transmitted relatively infrequently.

Operations of blocks 904, 905, and 907 may be repeated until a transmission time interval for data transmission from wireless terminal 200 occurs at block 909. On occurrence of a transmission time interval for transmission from wireless terminal 200, processor 201 may provide data bits from the transmit buffer 202 and may determine a first buffer indicator bit at block 911. More particularly, processor 201 may determine the transmit indicator bit responsive to a current number of transmission time intervals for the current delay condition (either received at block 901 or block 921), a current quantity of data allowed in a packet (either received at block 901 or block 917), and a current quantity of data in the transmit buffer 202.

At block 915, processor 202 may transmit an uplink data packet including the buffer indicator bit and the data bits of block 911. The data packet(s) of block 915 may be received at base station 100 as discussed above with respect to blocks 305 and 355 of FIGS. 3A, 3B, 6A, and 6B. At block 917, wireless terminal processor 201 may receive a new quantity of data allowed for an uplink data packet from base station 100 (through transceiver 209), and at block 921, wireless terminal processor 201 may receive a new number of transmission time intervals for the transmit buffer delay condition ($n_{TTI}$) from base station 100 (through transceiver 209). Base station 100 may transmit a new quantity of data allowed in an uplink data packet as discussed above with respect to block 309 of FIGS. 3A, 3B, 6A, and 6B, and base station 100 may transmit a new number of transmission time intervals defining the transmit buffer delay condition as discussed above with respect to block 605 of FIGS. 6A and 6B. Wireless terminal processor 201 may then update any such new information at blocks 919 and/or 913, and operations 904 to 923 of FIG. 9 may be repeated until communications are terminated at block 925.

By allowing the number of transmission time intervals for the transmit buffer delay condition to change during a same connection (e.g., after a PS RAB has been set up for the communication/call/session/link) in accordance with FIGS. 6A, 6B, and 9, wireless terminal processor 201 may support more accurate estimations of wireless terminal buffer 202 at base station 100. More particularly, the buffer indicator bit may be determined at block 911 based on a transmit buffer delay condition that may be calculated as a product ($n_{TTI}*E\_TFC$) of the number of transmission time intervals for the delay condition ($n_{TTI}$) and a quantity of data allowed in a data packet (E_TFC). Accordingly, the transmit buffer delay condition may change over the course of a same connection (e.g., communication, call, session, link, etc.).

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein. While VoIP data packet communications are discussed by way of example, embodiments may be implemented for other real time data packet communications such as audio and/or video streaming.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments, which fall within the spirit and scope of the present invention. Thus, to the maximum extent allowed by law, the scope of the present invention is to be determined by the broadest permissible interpretation of the following claims and their equivalents, and shall not be restricted or limited by the foregoing detailed description. Moreover, reference numbers have been provided in the claims by way of example without limiting the claims to particular embodiments identified by the reference numbers.

What is claimed is:

1. A method of operating a node of a radio access network communicating with a wireless terminal, the method comprising:
    receiving a packet including data and a buffer indicator bit wherein the packet is received at the node of the radio access network from the wireless terminal during a transmission time interval; and
    providing at the node of the radio access network an estimate of a quantity of data in a transmit buffer of the wireless terminal responsive to a status of the buffer indicator bit received at the node of the radio access network, wherein providing the estimate comprises,
        responsive to a first status of the buffer indicator bit, generating at the node of the radio access network a second estimate of the quantity of data in the transmit buffer as a first estimate of the quantity of data in the transmit buffer less a quantity of data allowed in a packet of a transmission time interval, and
        responsive to a second status of the buffer indicator bit, generating at the node of the radio access network a second estimate of the quantity of data in the transmit buffer as the greater of a quantity of data defining a transmit buffer delay condition and a first estimate of the quantity of data in the transmit buffer less a quantity of data allowed in a packet of a transmission time interval.

2. The method according to claim 1, wherein the quantity of data allowed in a packet comprises a first quantity of data allowed in a packet, the method further comprising:
    before providing the estimate, transmitting information from the node of the radio access network to the wireless terminal defining the first quantity of data allowed in a packet and defining a number of transmission time intervals for the transmit buffer delay condition; and
    responsive to providing the estimate, transmitting information from the node of the radio access network to the wireless terminal defining a second quantity of data allowed in a packet wherein the first and second quantities of data are different.

3. The method according to claim 2 wherein the quantity of data defining the transmit buffer delay condition is calculated as a product of the first quantity of data allowed in a packet and the number of transmission time intervals for the transmit buffer delay condition.

4. The method according to claim 1, further comprising:
    before providing the estimate, receiving scheduling information at the node of the radio access network from the wireless terminal wherein the scheduling information includes buffer status and power headroom information for the wireless terminal; and
    generating at the node of the radio access network the first estimate of the quantity of data in the transmit buffer responsive to the scheduling information including the buffer status.

5. The method according to claim 1 wherein the buffer indicator bit comprises a happy bit as defined according to 3GPP standards, and wherein the transmit buffer delay condition comprises a Happy_Bit_Delay_Condition defined according to 3GPP standards.

6. The method according to claim 1, further comprising:
    before receiving the packet, transmitting information to the wireless terminal defining a first quantity of data allowed in a packet, wherein the information defining the first quantity of data allowed in a packet is transmitted from the radio access node to the wireless terminal;
    determining at the radio access node a second quantity of data allowed in a packet responsive to the estimate of the quantity of data in the transmit buffer;
    when the first and second quantities of data are different, transmitting information defining the second quantity of data allowed in a packet, wherein the information defining the second quantity of data allowed in a packet is transmitted from the radio access node to the wireless terminal; and
    when the first and second quantities of data are the same, updating a number of transmission time intervals defining the delay condition for the transmit buffer responsive to a status of the buffer indicator bit.

7. The method according to claim 1 wherein receiving the packet comprises receiving the packet including data from the transmit buffer at the node of the radio access network.

8. The method according to claim 1 further comprising:
    updating at the node of the radio access network a number of transmission time intervals defining the delay condition for the transmit buffer responsive to a status of the buffer indicator bit; and
    transmitting the updated number of transmission time intervals defining the delay condition from the node of the radio access network to the wireless terminal.

9. The method according to claim 8, further comprising:
    before receiving the packet including the data and the buffer indicator bit, transmitting information defining a first number of transmission time intervals for a first delay condition and defining a first quantity of data allowed in a packet, wherein the information defining the first number of transmission time intervals is transmitted from the node of the radio access network to the wireless terminal;

wherein updating the number of transmission time intervals comprises generating at the node of the radio access network a second number of transmission time intervals for a second delay condition for the transmit buffer responsive to the status of the buffer indicator bit, and wherein transmitting the updated number of transmission time intervals comprises transmitting the second number of transmission time intervals defining the second delay condition for the transmit buffer from the node of the radio access network to the wireless terminal.

10. The method according to claim 9, wherein updating the number of transmission time intervals comprises, responsive to a first status of the buffer indicator bit, increasing the first number of transmission time intervals to generate the second number of transmission time intervals for the second delay condition for the transmit buffer.

11. The method according to claim 9, wherein updating the number of transmission time intervals comprises, responsive to a second status of the buffer indicator bit, decreasing the first number of transmission time intervals to generate the second number of transmission time intervals for the second delay condition for the transmit buffer.

12. The method according to claim 1 wherein the estimate is different than the buffer indicator bit.

* * * * *